Aug. 23, 1960 K. G. ADLER 2,950,024
MACHINES FOR DISPENSING HEATED COMESTIBLES
Filed July 9, 1956 2 Sheets-Sheet 1
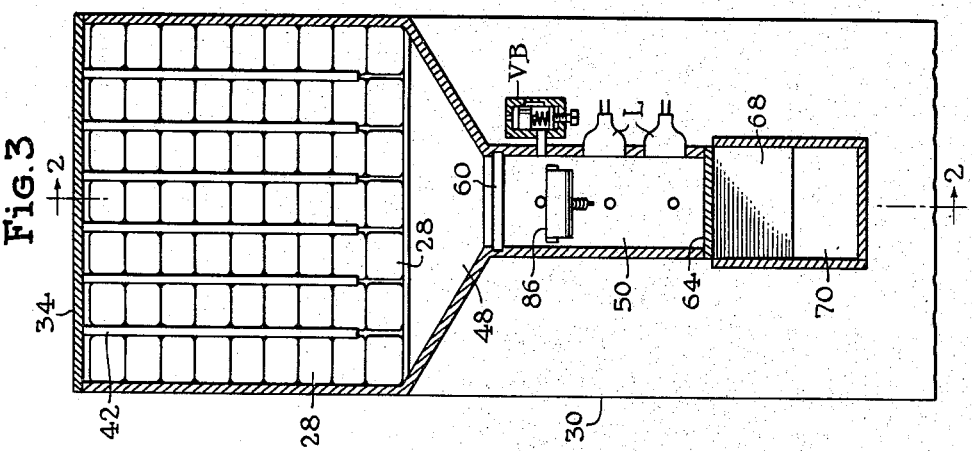
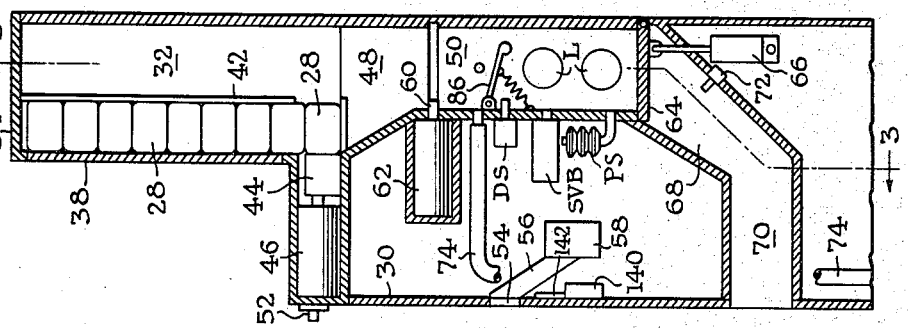
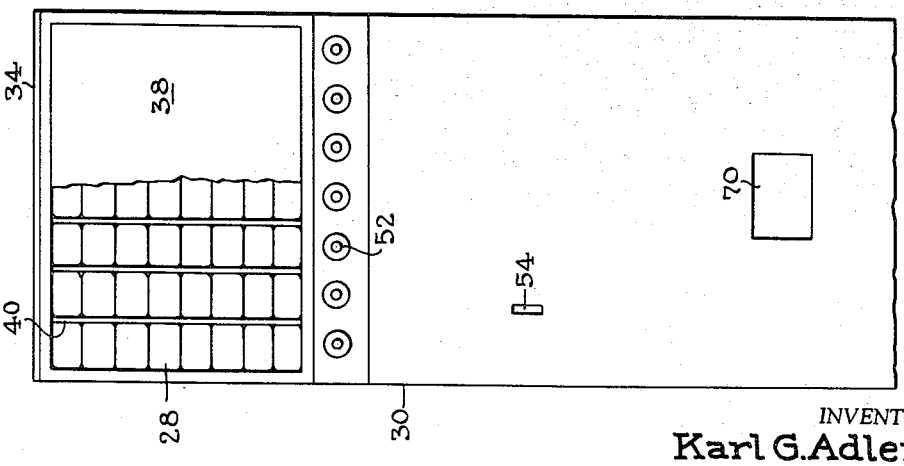
INVENTOR
Karl G. Adler
BY
Raphael Tourover
ATTORNEY

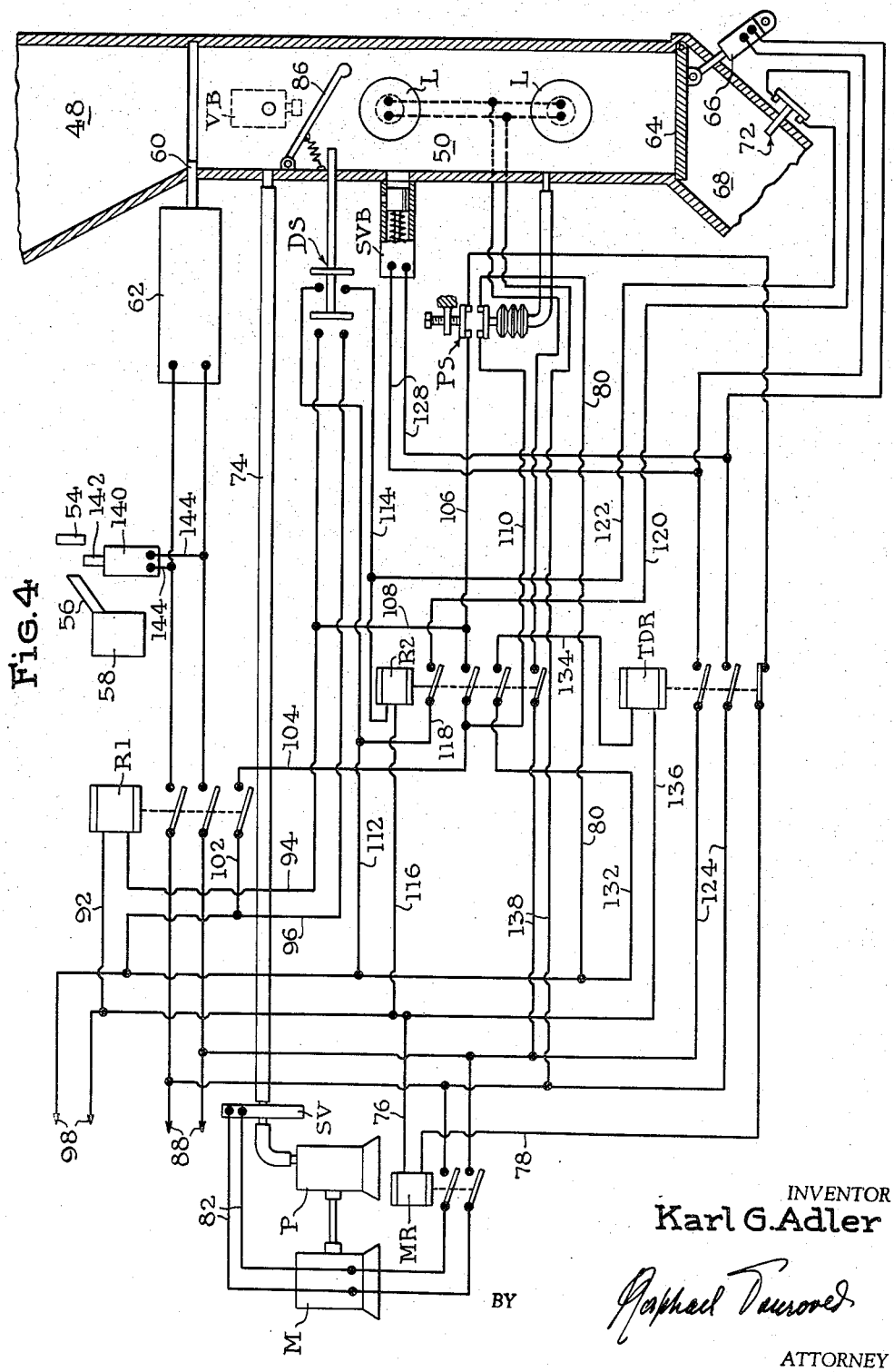

United States Patent Office 2,950,024
Patented Aug. 23, 1960

2,950,024

MACHINES FOR DISPENSING HEATED COMESTIBLES

Karl G. Adler, 1336 Missouri Ave., Washington, D.C.

Filed July 9, 1956, Ser. No. 596,564

1 Claim. (Cl. 221—15)

This invention relates to machines for dispensing heated comestibles. More particularly, this invention relates to food dispensing machines having means for inhibiting spoilage of the comestibles stored therein, and having improved means for heating a unit of a comestible prior to dispensing the same.

In my co-pending application Serial No. 415,345, there is disclosed an improved dispensing machine wherein comestibles subjected to rapid deterioration on exposure to atmosphere are stored in a vacuum to inhibit spoilage, and are dispensed by the unit through an interlock chamber in order to maintain a continuous vacuum in the storage compartment without interruption. In many instances, however, it is desirable to dispense comestibles in a heated condition, especially, in the case of certain precooked foods.

Storage of almost all comestibles at an elevated temperature, even in a vacuum, usually results in loss of quality. Obviously, storage under refrigeration will require a long heating period prior to dispensing, while storage at room temperature will still require an unduly long heating period. Hence, it is an object of this invention to provide a dispensing machine for comestibles that is equipped with improved means for rapidly heating a unit to be dispensed to a desired predetermined temperature, and/or for a predetermined period of time.

It is another object of this invention to provide a comestible dispensing machine with means for preserving the freshness, flavor, etc., of comestibles stored therein, and which preserving means cooperates with heating means for rapidly raising a unit to be dispensed to a desired elevated temperature.

The foregoing objects in general are accomplished by storing the comestibles in a vacuum storage compartment and heating a unit to be dispensed in a vacuum, i.e. in a reduced pressure environment. For this purpose, there is provided a separate heating chamber which preferably is insulated from the storage chamber during the heating period in order to avoid raising the temperature of the stored comestibles to a point where deterioration would be hastened. Vacuum storage will preserve most comestibles for extended periods of time at room temperature, even in the case of defrosted frozen foods. Hence, the heating need only raise the temperature of a unit to be dispensed from room temperature to a predetermined elevated temperature desired for consumption of the food. Moreover, the desired elevated temperature can be reached much more quickly when the heating is carried on in a vacuum than when the heating is carried on at atmospheric pressure.

While the invention is concerned primarily with dispensing precooked foods that need be heated only to a temperature appropriate for eating, it will be realized that the invention is applicable, in some instances, to the actual cooking of foods as they are dispensed. In such cases, the vacuum will hasten the cooking process.

Although the invention will be described with reference to a particular type of vending or dispensing machine adapted to handle articles such as wrapped sandwiches, it also will be realized that the invention is applicable to other types of machines and to machines adapted to dispense other types of comestibles, such as soups, beverages, frankfurters, defrosted precooked frozen foods, etc.

Referring now to the drawings:

Figure 1 is a front view of a machine embodying this invention for vending articles;

Figure 2 is a vertical sectional view of the machine shown in Figure 1, and taken on line 2—2 of Fig. 3;

Figure 3 is a sectional view taken on line 3—3 of Figure 2;

Figure 4 is a schematic view of the machine shown in Figures 1 to 3, illustrating the controls therefor.

Referring now to Figures 1 to 3 of the drawings:

There is shown an application of the invention to a machine for dispensing generally rectangular units 28 of solid comestibles, such as wrapped bread, sandwiches, pastries, etc. The machine has a casing 30 provided with an airtight storage chamber or compartment 32 at its top and a removable cover 34 therefor. Within the compartment 32 and along its front wall 38, which may be transparent if desired, is a transverse row of vertical separators 40 (Figure 1) having lateral flanges 42 at their rear edges for retaining the merchandise in a plurality of stacks. The flanges 42 are cut away adjacent the bottom of the separators 40, so that the lowermost article 28 in a stack can be pushed out without releasing the articles thereabove. A corresponding number of plungers 44 are arranged in front of the lower ends of the stacks and operated by solenoids 46 to push the lowermost article out of a stack to fall into a chute 48 that has converging sides and leads to a combined heating and interlock chamber 50.

A series of push-buttons 52 corresponding to the solenoids 46, and having conventional slide-locks (not shown), is arranged along the front of the machine, and at an appropriate location there is a coin slot 54 for a coin chute 56 leading to appropriate conventional mechanism 58 for permitting the operation of a button 52, to effect the operation of the corresponding plunger 44 to eject an article from the corresponding stack into the chute 48. Since such mechanism 58 is conventional, no further description is necessary here.

At the lower end of the chute 48, and separating the storage chamber 32 from the lower interlock chamber 50, is an appropriately gasketed, normally open sliding gate 60 similar to a gate valve and operated by a solenoid 62. Preferably, and for reasons which will appear later, the gate 60 is provided with heat insulation (not shown) to prevent heating in the interlock chamber 50, as later described, from appreciably elevating the temperature in the storage compartment 32. The bottom of the interlock chamber 50 is formed by a normally closed, appropriately gasketed, pivoted, trap door 64 operated by a solenoid 66. Below the trap door 64 is a chute 68 leading to a merchandise delivery opening 70 at the front of the machine. Mounted on the chute 68 in position to be engaged and opened by the trap door 64, when the latter is opened fully, is a normally closed limit switch 72.

A predetermined reduced pressure, i.e. degree of vacuum, is maintained in the storage compartment 32, and also in the interlock chamber 50, except when the latter is open to atmosphere during a dispensing operation, as later described, by a vacuum line 74 leading from the interlock chamber 50 to a vacuum pump P driven by an electric motor M.

The motor M is supplied with power from an appropriate source, here shown as conductors 88, and controlled by a relay MR havings two sets of normally open contacts. The coil of the relay MR and one set of normally closed contacts of a conventional adjustable pressure-responsive switch PS (which has two sets of normally closed contacts) are connected in series via conductors 76, 78, and 80, with another appropriate source of power, here shown as conductors 98. The pressure responsive switch PS is mounted on the interlock chamber 50 and responsive to reduced pressure therein to open both sets of its contacts when a predetermined degree of vacuum is attained in the chamber 50. Consequently, the switch PS automatically operates the pump P to maintain a predetermined reduced pressure in the chamber 50, and also in the storage compartment 32.

A normally closed solenoid valve SV is connected into the vacuum line 74 and has its solenoid connected in parallel with the motor M, by the conductors 82. Hence, the valve SV is open when the pump P is operating but closes on stoppage of the latter for any reason to prevent any reverse leakage of air through the pump that might break the vacuum in the compartment 32 and the chamber 50.

Additionally, an automatic vacuum breaker VB of the regulator type is connected to the chamber 50. The vacuum breaker VB is adjustable to admit to the chamber 50 at a predetermined reduced pressure therein to prevent too great a vacuum in the compartment 32 and the chamber 50 in the event the switch PS fails to open its contacts at its set, reduced operating pressure. Also connected to the interlock chamber 50 is a solenoid operated vacuum breaker SVB. Mounted on a side wall of the interlock chamber 50 is a "drop-through" switch DS having two sets of normally open contacts adapted to be closed momentarily by the movement of a spring biased plate 86, when struck by an article falling into the interlock chamber 50. The plate 86 is pivotally mounted on a side wall of the interlock chamber 50 and extends at a downward inclination in proximity to an opposite wall in position to be struck and moved out of the way by a falling article of merchandise.

The interlock chamber 50 also serves as a heating chamber for an article of merchandise being dispensed. Although various appropriate means could be utilized to heat an article of merchandise in the chamber 50, infra-red lamps L serve admirably, and two such lamps L are shown mounted on a side wall of the chamber 50 in position to direct their rays onto an article in the chamber.

The gate-operating solenoid 62 is supplied with power from the conductors 88 and is connected thereto through two sets of normally open contacts of a relay R1.

The coil of the relay R1 and one set of contacts of the drop-through switch DS are connected in series across the conductors 98, via the conductors 92, 94 and 96. A third set of normally open contacts of the relay R1 and a set of normally open contacts of a relay R2 are connected in series across the first-mentioned contacts of the switch DS, via conductors 96, 102, 104, 106, 108, and 94, to form a holding circuit for the relay R1. This circuit also includes the other set of contacts of the pressure-responsive switch PS which is connected in parallel with the aforementioned set of contacts of the relay R2, via conductors 106 and 110. The energizing coil of the relay R2 and the other set of contacts of the drop-through switch DS are connected in series across the conductors 98, via the conductors 112, 114, and 116. A self-energizing holding circuit is provided for the relay R2 and includes a second set of normally open contacts thereof and the limit switch 72 connected in series across said other set of contacts of the drop-through switch DS, via conductors 112, 118, 120, 122 and 114.

The solenoid 66 takes in power from the conductors 88 via the conductors 124 which have two sets of normally open contacts of an adjustable time delay relay TDR interposed therein. The relay TDR is of the type which delays operation for an adjustable period of time after energization of its coil. The solenoid of the vacuum breaker SVB is connected in parallel with the solenoid 66, for simultaneous operation therewith, by conductors 128. The energizing coil of the time delay relay TDR and a third set of normally open contacts of the relay R2 are connected in series across the conductors 98, via conductors 132, 134 and 136.

A normally closed set of contacts of the time delay relay TDR is connected in series into the conductor 78. The heating lamps L take their power from the conductors 88 via the conductors 138, one of which has interposed therein a fourth set of normally open contacts of the relay R2.

In operation of the machine, an article of merchandise is ejected from a selected stack, as aforedescribed, and falls into the interlock chamber 50 to land on the trap door 64. In its passage, the article actuates the drop-through switch DS to momentarily close both sets of its contacts. Closing of these contacts energizes both relays R1 and R2, which are then maintained energized by their respective holding circuits. Consequently, the solenoid 62 is energized to close the gate 60 and seal off the storage compartment 32 from the interlock chamber 50 to both maintain the vacuum in the former and prevent heat transfer thereto during the heating of the article in the interlock chamber. At the same time, energization of the relay R2 closes the power circuit for the infra-red lamps L so that the latter commence to heat the article in the interlock chamber 50 while under the vacuum therein.

Energization of the relay R2 also completes the energizing circuit of the time delay relay TDR which is adjusted to operate only after a predetermined period of time equal to that for heating the article to the proper temperature for consumption, or equal to that necessary to cook the food, if such is necessary. Obviously, in the latter case, a thermostat (not shown) could be operatively associated with the lamps L to maintain the food at a desired temperature.

When the time delay TDR operates to close its two sets of normally open contacts and to open its one set of normally closed contacts, the vacuum breaker SVB is energized to break the vacuum in the chamber 50 and the solenoid 66 operates to open the trap door 64 and drop the heated merchandise into the delivery chute 68. At the same time, the relay MR is positively de-energized to prevent operation of the motor M, and consequently the pump P, while the interlock chamber 50 is open to atmosphere.

When the trap door 64 opens fully, however, it engages and momentarily opens the limit switch 72, thus interrupting the self-energizing circuit of the relay R2 and de-energizing the latter. De-energization of the relay R2 opens the energizing circuit of the relay TDR so that it rapidly opens its two sets of normally open contacts and closes its one set of normally closed contacts.

Consequently, the trap door 64 closes, the vacuum breaker SVB closes, and the motor M starts to operate the pump P because of the atmospheric pressure in the interlock chamber which has closed both sets of contacts of the pressure responsive switch PS.

De-energization of the relay R2 does not interrupt the holding circuit of the relay R1, however, because the switch PS is then closed. Consequently, the relay R1 is not de-energized to open the gate 60 until the predetermined degree of vacuum is reestablished in the interlock chamber 50 to open the contacts of the pressure responsive switch PS. In this connection, a coin-blocking solenoid 140 having a plunger 142 to block the coin slot 54 may be connected by conductors 144 in parallel with the solenoid 62 for simultaneous operation therewith to prevent the insertion of another coin for another vending cycle until the sliding gate 60 is open.

It thus will be seen that the objects of this invention have been fully and effectively accomplished. It will be realized, however, that the specific structure described is illustrative only of the principles of the invention and that the invention can be embodied in various other types of dispensing machines and is susceptible of many modifications. For example, the storage chamber can be cooled to prevent an undue rise in temperature of the comestibles stored therein because of their proximity to the heating chamber. The heating chamber can be heated continuously and closed off from the storage chamber except during the transfer of a unit therebetween. In that case, a predetermined temperature and degree of vacuum can be maintained continuously in the heating chamber and a second interlock chamber interposed between the heating chamber and the delivery outlet. This arrangement would serve to hasten the entire dispensing operation by speeding the heating process.

Obviously, the invention also embraces the mixing of comestibles in the heating chamber, as in the case of adding hot water to ground coffee for actually brewing coffee. In brewing coffee, it is advantageous to use deaerated or deoxygenated water. Furthermore, in the case of beverages, coffee, soups, etc., metering valves will serve admirably for transferring a unit between the various chambers.

Essentially, the invention embraces the storage of comestibles in a vacuum, the heating of at least a unit thereof in a vacuum for rapid heating, and the dispensing of a heated unit without modification of the storage conditions. Preferably, the machine for performing these functions is entirely automatic in its operation, but not necessarily coin or check-operated. Hence, it will be understood that the scope of the invention is defined by the following claim:

I claim:

In a machine for dispensing comestibles, the combination comprising: a storage chamber for comestibles; a heating chamber sealably connected to said storage chamber and having a dispensing outlet; means for transferring a unit of the comestible from said storage chamber to said heating chamber; means for sealing off the connection between said chambers; means for heating the unit in said heating chamber; timer means for operating said heating means; means for discharging the unit from said heating chamber through said dispensing outlet and for sealing off the latter; means for establishing and maintaining a predetermined degree of vacuum in each of said chambers; means independent of said discharge means for relieving the vacuum in said heating chamber; and control means responsive to the transfer of a unit connected to said sealing-off means, heating means, timer means, discharge means, and relieving means for operating them in timed relation to effect a dispensing cycle in which after a unit is transferred from said storage to said heating chamber, said sealing-off means seals off the connection between said chambers, the unit is heated to a predetermined temperature in said heating chamber while under the vacuum therein, said relieving means relieves the vacuum in said heating chamber, said discharge means discharges the heated unit through said outlet and seals off the latter, said relieving means is rendered inoperative, said vacuum-establishing means re-establishes a vacuum in said heating chamber, and said connection-sealing-off means opens the connection between said chambers in readiness for another dispensing cycle.

References Cited in the file of this patent

UNITED STATES PATENTS

| 2,351,853 | Graham | June 20, 1944 |
| 2,531,238 | Tandler et al. | Nov. 21, 1950 |
| 2,576,874 | Acton | Nov. 27, 1951 |
| 2,590,580 | Schiavone | Mar. 25, 1952 |
| 2,831,419 | Timm | Apr. 22, 1958 |

FOREIGN PATENTS

| 611,054 | Great Britain | Oct. 25, 1948 |

UNITED STATES PATENT OFFICE

CERTIFICATE OF CORRECTION

Patent No. 2,950,024                        August 23, 1960

Karl G. Adler

It is hereby certified that error appears in the printed specification of the above numbered patent requiring correction and that the said Letters Patent should read as corrected below.

Column 3, line 22, after "admit", insert -- air --.

Signed and sealed this 11th day of April 1961.

(SEAL)
Attest:
ERNEST W. SWIDER

Attesting Officer

ARTHUR W. CROCKER
Acting Commissioner of Patents